(12) United States Patent
Tailhades et al.

(10) Patent No.: US 7,425,284 B2
(45) Date of Patent: Sep. 16, 2008

(54) INERT ANODE FOR THE PRODUCTION OF ALUMINIUM BY FUSED BATH ELECTROLYSIS AND METHOD OF MAKING THIS ANODE

(75) Inventors: Philippe Tailhades, St.Orens de Gameville (FR); Abel Rousset, Ramonville St.Agne (FR); Armand Gabriel, Le Fontanil (FR); Véronique Laurent, Voreppe (FR); Valérie Baco-Carles, Pinsaguel (FR); Airy-Pierre Lamaze, Reaumont (FR)

(73) Assignee: Aluminum Pechiney, Voreppe (FR)

( * ) Notice: Subject to any disclaimer, the term of this patent is extended or adjusted under 35 U.S.C. 154(b) by 340 days.

(21) Appl. No.: 10/575,091

(22) PCT Filed: Oct. 5, 2004

(86) PCT No.: PCT/FR2004/002509

§ 371 (c)(1),
(2), (4) Date: Apr. 7, 2006

(87) PCT Pub. No.: WO2005/035813

PCT Pub. Date: Apr. 21, 2005

(65) Prior Publication Data

US 2007/0056848 A1    Mar. 15, 2007

(30) Foreign Application Priority Data

Oct. 7, 2003    (FR) .................................. 03 11700
Jul. 7, 2004    (FR) .................................. 04 07538

(51) Int. Cl.
*H01B 1/08* (2006.01)
(52) U.S. Cl. .................. 252/521.2; 264/603; 264/612; 264/613; 264/614; 264/618; 264/656; 264/681; 252/519.1; 252/519.15; 204/243.1; 204/291; 205/385; 205/386; 205/387

(58) Field of Classification Search .............. 252/519.1, 252/519.15, 521.2; 264/603, 612, 613, 614, 264/618, 656, 681; 204/243.1, 291; 205/385, 205/386, 387
See application file for complete search history.

(56) References Cited

U.S. PATENT DOCUMENTS

| 4,089,681 | A | | 5/1978 | Gueussier et al. |
| 4,247,500 | A | * | 1/1981 | Dixon et al. ................ 264/612 |
| 4,400,431 | A | * | 8/1983 | Henslee et al. ............. 428/402 |
| 4,439,532 | A | * | 3/1984 | Strother, Jr. ................ 501/117 |
| 4,454,015 | A | | 6/1984 | Ray et al. |
| 4,455,211 | A | | 6/1984 | Ray et al. |
| 4,473,483 | A | | 9/1984 | Imamura et al. |
| 4,529,494 | A | | 7/1985 | Gueussier et al. |
| 4,582,585 | A | | 4/1986 | Ray |
| 4,713,300 | A | | 12/1987 | Sowman |
| 4,871,438 | A | | 10/1989 | Marschmann |
| 7,014,881 | B2 | * | 3/2006 | Liu et al. ...................... 427/78 |
| 2005/0087916 | A1 | * | 4/2005 | Easley et al. ................ 264/611 |

FOREIGN PATENT DOCUMENTS

| EP | 1268105 | 1/2003 |
| WO | WO 01/31089 | 5/2001 |
| WO | WO 01/72456 | 10/2001 |

* cited by examiner

*Primary Examiner*—Bruce F Bell
(74) *Attorney, Agent, or Firm*—Banner & Witcoff, Ltd.

(57) ABSTRACT

The purpose of the invention is a process for making a solid part designed to form all or part of an anode for the production of aluminium by fused bath electrolysis, containing a cermet formed from at least one metallic oxide such as a mixed oxide with spinel structure, and at least one metallic phase, in which a mixed oxide is used containing a metal R in the form of a cation in its chemical structure, the said metal R being fully or partly reducible by a reduction operation during the manufacturing process, so as to form all or part of the said metallic phase. This process can provide a cermet with a uniform distribution of fine metallic particles.

46 Claims, 1 Drawing Sheet

INERT ANODE FOR THE PRODUCTION OF ALUMINIUM BY FUSED BATH ELECTROLYSIS AND METHOD OF MAKING THIS ANODE

CROSS REFERENCE TO RELATED APPLICATIONS

This is a §371 National Stage Application of International Application No. PCT/FR04/002509 filed Oct. 5, 2004 which claims priority to French Application Nos. 0311700 filed Oct. 7, 2003 and 0407538 filed Jul. 7, 2004.

BACKGROUND OF THE INVENTION

1. Field of the Invention

The invention relates to anodes intended for the production of aluminium by electrolysis. It particularly relates to the so-called "inert" or "non consumable" anodes and their preparation and use.

2. Description of the Related Art

Metal aluminium is produced industrially by fused bath electrolysis, namely by electrolytic reduction of alumina in solution in a molten cryolite bath called an electrolyte bath, particularly using the well-known Hall-Héroult process. The electrolytic reduction is made in electrolytic cells comprising an electrolytic pot provided with carbon cathode elements and one or several anodes. The electrolyte bath is contained in the pot and the anodes are partially immersed in the electrolyte bath. The electrolytic current is used to maintain the electrolyte bath at the temperature required by the Joule effect. The electrolytic cell is fed regularly with alumina so as to compensate for alumina consumption caused by the electrolysis reactions.

In the standard technology, anodes are made of a carbonaceous material and the electrolysis is done at a temperature typically of the order of 950° C. Since the anodes made of a carbonaceous material are progressively consumed during the electrolysis, the height of the part of the anodes that is immersed in the bath needs to be frequently adjusted and action needs to be taken on the cell to replace the anodes. Moreover, degradation of anodes produces carbon dioxide (more than one tonne of $CO_2$ per tonne of aluminium produced) which contributes to the greenhouse effect.

At the present time, research is being carried out on the design of so-called inert or non-consumable anodes with a very low wear rate, namely preferably less than 1 cm/year, in order to obtain lives longer than one year and to produce a metal with commercial purity.

In particular, it has been proposed to use composite materials with a ceramic matrix containing one or several metallic phases as electrode materials. In particular, these metallic phases can improve the thermomechanical properties of electrodes that are subjected to high thermal stresses that could deteriorate them. This type of composite materials, that contain at least one "ceramic" phase and at least one metallic phase, is known under the term "cermet".

Studies have been carried out particularly on cermets for which the ceramic phase is a mixed phase of nickel oxide (NiO) and nickel ferrite ($NiFe_2O_4$), and for which the metallic phase for example contains iron, nickel or copper; for example, see U.S. Pat. Nos. 4,454,015, 4,455,211 and 4,582,585. Several recent patents relate to $Ni_xFe_{3-x}O_4/Ni_{1-y}Fe_yO$/Cu type cermets, in other word based on nickel ferrite and nickel oxide, the metallic phase being mainly copper.

Cermets of this type are typically produced using a procedure with four main steps:

- a mixture of oxide powers (for example $NiFe_2O_4$ and NiO, or $Fe_2O_3$ and NiO), and metallic copper,
- the addition of an organic binder to the previous powder mixture, to obtain a "bonded" powder,
- pressing (uniaxially or isostatically) of the bonded powder to obtain a coherent "green" solid, with the shape defined by the geometry of the pressing mould,
- a heat treatment of the green solid under controlled atmosphere at a temperature of about 1300° C., to decompose the binder and sinter the powder.

French application FR 03-03045 by Aluminium Pechiney describes such a production process.

The microstructure of the cermet obtained then includes spinel ferrite grains, nickel oxide grains and metallic particles with an average size typically more than 10 µm in the case of the copper. Some copper is usually bled out at the surface of the cermet. Metallic drops with a diameter between about 100 microns and several millimetres can thus be observed. It is usually necessary to eliminate this roughness by appropriate chemical or mechanical treatments before the cermet is used in an electrolytic cell. These treatments increase manufacturing costs and are usually difficult to implement.

Furthermore, the process for making such cermets requires strict control over the sintering atmosphere to avoid oxidising the copper. The role of the organic binder is to facilitate shaping and to make sure that the "green" material is cohesive, and it must not react with oxides or metallic phases. Moreover, during the heat treatment, decomposition of the binder (the so-called "debinding" step) under a neutral or slightly oxidising atmosphere leads in particular to the formation of reducing unsaturated carbonaceous species that could modify the chemical composition or the microstructure of the cermet. Therefore, control over the debinding step is very difficult.

The applicant searched for solutions that could reduce or even prevent these disadvantages.

SUMMARY OF THE INVENTION

An object of the invention is a process for making a part with a determined shape designed to form all or part of an anode for the production of aluminium by fused bath electrolysis, containing a cermet comprising at least one metallic oxide, such as a mixed oxide with spinel structure, and at least one metallic phase, in which a mixed oxide is used containing a metal R in the form of cations in its chemical structure, in other words a mixed oxide in which the metal R is one of its constituents, the said metal R being fully or partly reducible by a reduction operation during the manufacturing process, so as to form all or part of the said metallic phase.

The said mixed oxide, that comprises at least two distinct metallic elements including the metal R, is typically a single phase oxide. The said mixed oxide is preferably an oxide with spinel structure.

The initial mixed oxide or the "precursor" oxide, possibly mixed with one or several other oxides, is bonded, in other words mixed with the binder, and compacted so that it has the required determined shape. The part is then heat treated so as to debind it and to sinter it. The process advantageously comprises a complementary stabilisation heat treatment.

DETAILED DESCRIPTION OF A PREFERRED EMBODIMENT

Figure 1:
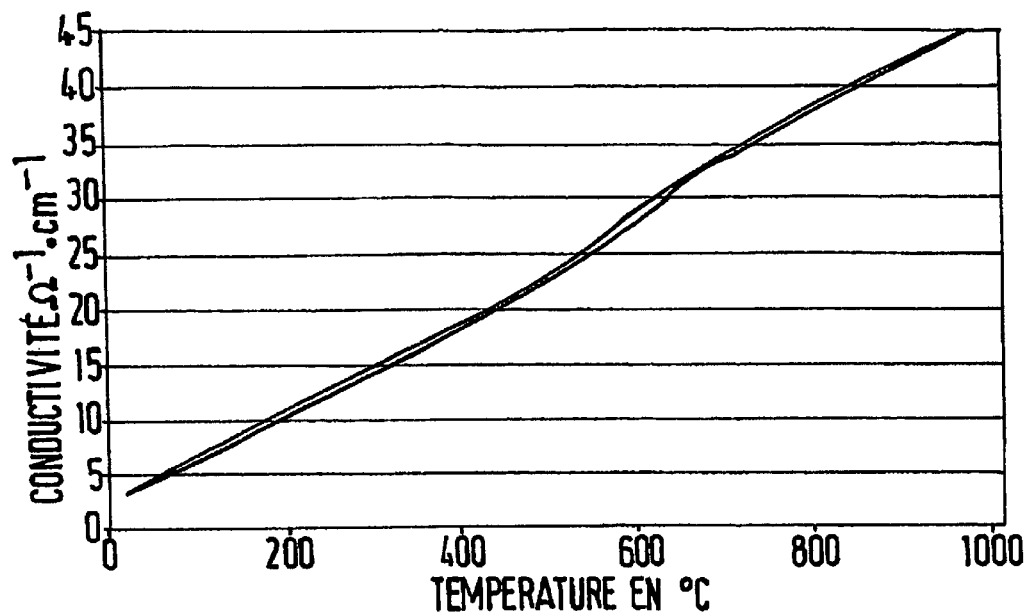
FIGS. 1 and 2 show electrical conductivity curves as a function of the temperature, for parts obtained by the process according to the invention.

The applicant has found a process to produce cermets which in particular result in only a very small bleed out of metal after sintering. They are thus significantly different from cermets produced by known methods. Furthermore, these cermets are characterized by a particular micro-structure, namely dispersion of very small metallic particles (a few micrometers) within a matrix of a mixed metal oxide, typically a mixed oxide with spinel structure. Moreover, the process can be used to sinter cermets for which single phase mixed oxide compositions are considered to be difficult to sinter, such as nickel and iron spinels. The process according to the invention can also be used to produce cermets at lower sintering temperatures than cermets according to prior art, so that in some cases more robust and more reliable furnaces can be used based on a less expensive technology, particularly for heat treatment temperatures below 1200° C.

The process for making cermet based parts according to the invention is based on the preparation of a precursor of the oxide phase of the cermet in the form of a mixed oxide in which the metal that will form the largest part (typically more than 60%, or possibly more than 75% by weight) of the metallic phase of the final cermet is present in the form of an oxide, and is a constituent of the mixed oxide. The initial solid solution, for example consisting of spinel oxides, can very uniformly disperse cationic constituents and can result in a final cermet that is itself very homogenous and densified at the end of a treatment at moderate temperature, typically below 1000° C. This sinterability can make it possible to make solid parts or parts with dimensions of the order of centimeters, thus guaranteeing a life of several years under working conditions.

The applicant has discovered that it is possible to reduce all or part of the cations of the future metallic constituent of the final cermet present in the initial mixed oxide, by a controlled reduction operation. Due to this process, the metal formed is present in the form of a significant proportion of very fine metallic particles dispersed in the ceramic material. One other advantage of the process according to the invention is that the ceramic material provides protection of the fine metallic particles obtained against subsequent accidental reoxidation, which is not the case for metallic particles obtained by reduction starting from the corresponding single oxide or a mixture of this single oxide with other oxides.

According to the invention, the reduction preferably takes place at between 200 and 750° C., while sintering is done at a temperature typically more than 900° C. The possibility of doing a reduction according to the invention before sintering and therefore separating these two operations provides a means of optimising them separately. The invention can thus avoid the disadvantages of a possible reduction of one or several oxides in the ceramic phase during high temperature sintering, regardless of whether this reduction is required or accidental.

According to one advantageous embodiment of the invention, the reduction operation is carried out wholly or partly on the mixed oxide powder, before the part is shaped. This embodiment has the advantage that it produces a very homogenous dispersion of metallic particles, and this homogeneity is maintained in the final part.

According to another advantageous embodiment of the invention, the reduction operation is carried out wholly or partly after the part has been shaped. This embodiment has the advantage of keeping the metal R in oxidised form until the consolidation heat treatment of the part, thus making it easier to avoid possible reoxidisation of the reduced metal.

In practice, the duration of the reduction treatment is sufficient so that at least a predetermined part of the metal cations designed to form the dispersed metallic phase of the cermet is reduced in metallic form so as to form a composite material containing at least an oxide phase, particularly with spinel structure, and a metallic phase. The cations of the metal (or metals) in this metallic phase are preferably chosen so that they can be more easily reduced than the cations of other metals forming the mixed oxide with spinel structure. There is no need to wait for thermodynamic equilibrium during the reduction. The reduction step is interrupted when the required phases have been obtained.

Another object of the invention is a part with a determined shape and comprising at least one mixed oxide, particularly a mixed oxide with spinel structure, in which one constituent element is wholly or partly reduced according to the invention.

Another object of the invention is an anode comprising at least one part according to the invention.

Another object of the invention is the use of an anode comprising at least one part according to the invention for the production of aluminium by fused bath electrolysis.

Another object of the invention is an electrolytic cell comprising at least one anode containing at least one part according to the invention.

According to the invention, the parts are usually large parts which have a minimum active surface area (so that they can be used with an acceptable electrolytic current density) and also a sufficiently high electrical section so that the voltage drop on the anode is acceptable at the nominal intensity and a sufficiently large volume so that its properties remain within acceptable limits when significant wear has occurred after several years of use. Large dimensions are also imposed by technological constraints that usually make it necessary to limit the number of anodes in an electrolytic cell. The said large dimensions are typically of the order of 3 to 5 cm for small parts and of the order of 30 to 50 cm for large parts.

In one preferred embodiment of the invention, the process for manufacturing a part with a determined shape designed to form all or part of an anode for the production of aluminium by fused bath electrolysis and containing a cermet comprising at least one metallic oxide with spinel structure and at least one metallic phase, comprises:

preparation of a powder containing at least one mixed oxide with spinel structure in which one of the constituents is a metal R present in the form of cations, the said metal R being wholly or partly reducible by a reduction operation, so as to form all or part of the said metallic phase, the said reduction operation preferably being carried out at least partly during the manufacturing process of the said part, preparation of a mixture containing the said powder and a binder, typically an organic binder, shaping of the said part by compaction of the mixture, a debinding operation of the said part, a sintering operation of the said part.

It is known that metallic oxides are ionic products, metals being in the form of cations, and oxygen being in the form of $O^{2-}$ anions. The mixed oxide with spinel structure may also contain one or several doping agents that could improve the usage properties of the part.

The metal R is preferably at least one metal chosen particularly from among copper, silver, nickel, iron, cobalt and mixtures of these metals.

The said mixed oxide contains at least one metal M, that can exist in at least two valence states $M^{n+}$ and $M^{(n-1)+}$, as a constituent in the form of cations. Examples of metals M are particularly iron (valences 2 and 3), molybdenum (valences 3 and 4), manganese (valences 3 and 4), vanadium (valences 4 and 5), cobalt (valences 2 and 3) and chromium (valences 2 and 3).

In one particular embodiment of the invention, the said mixed oxide may also contain at least one metal as a constituent whose cation reduces the solubility of the mixed oxide with spinel structure in the molten cryolite, this metal being chosen particularly from among nickel, chromium and tin.

The said mixed oxide may also contain at least one metal with a valence state of more than 3, particularly capable of increasing and/or stabilising the electrical conductivity when hot. This metal will be chosen particularly from among titanium, zirconium, hafnium, vanadium, molybdenum and tungsten.

For example, the mixed oxide with spinel structure may be obtained by a solid-solid reaction or by decomposition of mixed hydroxides or mixed salts of organic acids such as mixed oxalates, etc., that leads to a powder that is sufficiently fine to be shaped and sintered by conventional processes.

The said mixed oxide may advantageously be obtained by a "spray-pyrolysis" process comprising:
    preparation of at least one salt of metallic elements that will form the mixed oxide, typically by a mineral acid attack on pure metals;
    dissolution of the said salt(s), or putting them into suspension in a carrier fluid, typically water;
    spraying of the said solution and/or the said suspension at a sufficiently high temperature to cause evaporation of the carrier fluid and thermal decomposition of the said salt(s), so as to obtain the said mixed oxide.

The spray-pyrolysis process can be used to obtain the said mixed oxides efficiently, with an efficiency typically greater than 95%, which cannot be obtained by precipitation/washing/thermal decomposition in a furnace. It can also be used to obtain mixed oxides with several metallic elements more easily, particularly with very different concentrations for each element, and to precisely manage particle sizes to facilitate sintering and handling, usually between 0.5 and 150 µm, and preferably between 1 and 80 µm, and even more preferably between 2 and 10 µm.

Since the binder is mixed with "oxide" type phases with low reactivity, it is possible to use a very wide range of organic products. The oxide phase or oxide phases mixed with the binder will not tend to separate during manipulations or storage, as is the case for oxide mixtures with metals according to the conventional process.

The binder is typically polyvinyl alcohol, but it could be any other known organic or organometallic binder, such as acrylic polymers, polyglycols (for example polyethylene glycol), polyvinyl acetates, polyisobutylenes, polycarbonates, polystyrenes, polyacrylates, stearic acid or stearates such as zinc stearate.

The initial mixture may possibly also contain one or several doping agents and/or one or several sintering additives.

The initial mixture is typically substantially free of a metallic phase (namely typically less than 0.5% atomic), but it may possibly contain one or several elements in metallic form, and particularly noble metals such as silver, gold, palladium or platinum.

The initial mixture may possibly also contain a determined proportion of a solid reducing agent in powder form, such as a powder made of a carbonaceous material (typically carbon black and/or graphite), a powder of an organometallic compound containing at least the said metal R in cation form (typically an oxalate, such as a Cu, Cu—Ni or Cu—Ag oxalate) or a mixture of them. The solid reducing agent reduces the said metal R before, during or after the debinding operation. The use of a powder solid reducing agent has the advantage of producing a very homogenous reduction, particularly for very large parts for which reduction by a gas reducing agent could be limited by gas diffusion in the part. Preferably, the specific surface area of the solid reducing agent powder is greater than or equal to the specific surface area of the initial mixed oxide containing the metal R that will be reduced.

In one advantageous variant of the invention, the manufacturing process also comprises an "atomisation" operation on the mixture before the shaping step. This operation consists of putting the mixture into suspension in a carrier fluid (such as water) and spraying of the suspension so as to completely dry the suspension before its collection and handling.

This variant has the advantage of producing a very homogenous mixture to obtain a homogenous dispersion of very small metallic particles in the final cermet. It is particularly advantageous if the mixture does not contain any (or very little) metallic phase since it then makes the mixture very homogenous.

The said mixture is shaped by compaction to produce a green part with the said determined shape. This compaction is typically done by uniaxial or isostatic pressing of the said mixture in a mould with a determined shape.

The debinding operation comprises a heat treatment at a temperature that depends on the nature of the binder used and is usually between 400 and 500° C. For example, the hold time at this temperature can vary from 0.5 h to 10 h depending on the size and more particularly the thickness of the manufactured parts, usually from 1 h to 5 h for solid parts or shaped parts with a maximum thickness of a few millimetres to a few centimetres.

The reduction operation according to the invention comprises a heat treatment that can cause the formation of the metallic phase(s) from the metal R contained in the said mixed oxide in the form of cations. This reduction is preferably a controlled reduction that is preferably controlled so as to preferentially reduce the metal R.

In one advantageous embodiment of the invention, the reduction operation is carried out wholly or partly on the part after the debinding operation.

According to a first variant of this embodiment, the debinding operation of the green part includes a heat treatment under an oxidising atmosphere (for example air) that can decompose the binder in the form of $CO_2$ and water vapour, therefore without leaving any deposits in the furnace and therefore being easy to eliminate, and the reduction operation is carried out under a reducing atmosphere that subjects the debinded part to the action of a reducing agent that reduces all or some of the cations of the metal R present in the said mixed oxide, to the metallic state. In particular, the reducing agent may be hydrogen, carbon monoxide, ammonia and mixtures of them. For example, it would be possible to use a mixture of inert gas (such as argon or nitrogen) and the reducing agent. In the case of hydrogen, the mixture typically contains 0.5 to 10% of hydrogen by volume, and preferably from 0.5 to 4% so as to remain below the explosivity limit at ambient temperature.

This variant prevents the formation of unstable carbonaceous chains that generate reducing deposits in cold parts of the furnace or the part to be sintered, since due to their reducing nature, the said deposits can subsequently modify the chemical composition or the microstructure of the cermet.

According to another variant of this embodiment, the reduction operation is carried our wholly or partly on the part during the debinding operation. Advantageously, the debinding operation of the green part includes a debinding and reduction heat treatment under a controlled atmosphere in which the reducing agent is the binder or decomposition products of the binder.

In another advantageous embodiment of the invention, the reduction operation is carried out wholly or partly on the powder containing the mixed oxide, preferably before the binder is introduced. The debinding is then preferably done under a controlled atmosphere, so as to avoid reoxidation of the metal.

According to one advantageous variant of the invention, the powder also contains a determined proportion of a powder of a solid reducing agent, such as a powder of a carbonaceous material (typically carbon black and/or graphite), a powder of an organometallic compound containing at least the said metal R in the form of a cation (typically an oxalate such as Cu oxalate, Cu—Ni oxalate or Cu—Ag oxalate), or a mixture of them. The solid reducing agent powder will reduce all or part of the said metal R during the reduction operation. Preferably, the specific surface of the solid reducing agent is greater than or equal to the specific area of the initial mixed oxide containing the metal R that will be reduced.

According to a particular embodiment of the invention, the reduction operation is adapted so as to enable reduction of a predetermined proportion of cations of the metal R, to the metallic state. To achieve this, the treatment is usually done at a temperature between 200 and 750° C., preferably between 250 and 550° C., and even more preferably between 300 and 450° C., for a time that can vary from 0.5 to 10 h, particularly from 1 h to 5 h for solid parts or shaped parts with a maximum thickness of between one millimetre and one decimetre, and preferably between 2 h and 4 h for parts with a maximum thickness of a few centimetres.

Advantageously, the reduction is done so as to obtain a proportion of metallic phase in the cermet equal to at least 1% by weight, and preferably more than 5% by weight, and typically between 10 and 30% by weight.

The applicant estimates that the reduction operation according to the invention can be industrially implemented as follows:

A rotary furnace is used capable of reducing 3 t of mixed oxide per hour, namely for example 420 kg/h of Cu in oxide form with 2484 kg/h of Nickel ferrite (with an apparent density of 700 kg/M$^3$), which is sufficient to supply material for inert anodes for one or several aluminium reduction plants.

A 1.5 m diameter furnace with an overall length of 15 m for a useful isothermal length of 12 m, is used for reduction at a stable temperature of 450° C. with a flow of 4000 m3/h of argon with 4% by volume of hydrogen, in countercurrent flow. The applicant has estimated that an efficiency of 93% can be obtained for a typical residence time of 1 h, with an angle of inclination of the furnace between 3 and 5°, a typical rotation speed between 2 and 3 rpm, and for a maximum retention of the order of 18%. At 350° C., the same operation would require an increase by a factor of 2 in the residence time of the powder to be reduced, by reducing the rotation speed or the angle of inclination of the furnace or both, without significantly increasing retention, but probably degrading the hydrogen efficiency by several percent.

The part sintering operation is done under a controlled atmosphere, typically under an inert atmosphere (for example argon or nitrogen). If the reduction operation is done on a debinded part, the sintering is typically carried out after the reduction operation, in the same furnace. Sintering in a controlled atmosphere preferably increases the temperature of the compound so that its densification rate is typically more than 90%, and preferably more than 95%.

In one advantageous variant of the invention, the process includes a complementary treatment at a temperature higher than the service temperature, typically 1050 to 1200° C. which, while remaining much less than the conventional process, provides a means of stabilising working properties (electrical conductivity, resistance to corrosion, thermomechanical strength), while avoiding coalescence of metallic phases or growth of oxide phase grains, since these phenomena could degrade these working properties.

The process according to the invention may comprise optional additional operations such as operations for final shaping of the part (machining or other) that could produce an anode suitable for use, particularly for electrical connections.

As indicated above, the process according to the invention can be used to prepare cermets with a microstructure very different from the microstructure of traditional composite materials. They are composed of small metallic particles (dimensions not exceeding a few µm). They are very well densified (density more than about 95% of the theoretical value) and only have very little bled out metal. These results are obtained at sintering temperatures typically of the order of 900-1000° C. only, which is about 400° C. less than for sintering of cermets obtained by known processes.

It is known that many oxides have the same structure as natural spinel ($MgAl_2O_4$). For example, this is the case for magnetite $Fe_3O_4$. More generally, there is an entire family of mixed oxides of the $AB_2O_4$ type, where A represents a divalent metal (or several divalent metals) and B represents a trivalent metal (or several trivalent metals) that have a spinel structure. This family is often denoted as being the family of spinel oxides.

The spinel structure comprises a compact cubic lattice of $O^{2-}$ ions and generally divalent $A^{2+}$ and trivalent $B^{3+}$ metallic cations. Inside this lattice, metallic cations are distributed between octahedral sites and tetrahedral sites. Some divalent ions could be replaced by trivalent ions without changing the number of cationic charges balancing anionic charges of the lattice of oxygen ions, by replacing three divalent ions by two trivalent ions. Therefore, a vacancy is created in this case. Conversely, if trivalent ions are replaced by divalent ions, the only way of keeping the number of cationic constant is to replace two trivalent cations by three divalent cations, provided that it is possible to use a vacancy already present in the lattice. It will also be possible to introduce cations with the valence of more than three into the spinel structure. For example, to introduce a $Ti^{4+}$ ion into a spinel ferrite, two $Fe^{3+}$ ions would have to be replaced by a $Ti^{4+}$ cation and a $Fe^{2+}$ cation. Therefore, this would introduce $Fe^{2+}$ ions that, in cooperation with the $Fe^{3+}$ ions, would enable conduction.

Moreover, some spinel oxides deviate from stoichiometry, sometimes spontaneously, and sometimes by controlled oxidation or reduction. All stoichiometric and non-stoichiometric spinels are often represented by a formula like $AB_2O_{4+\delta}$ in which δ is a positive number (superstoichiometric spinels), zero (stoichiometric spinels) or negative (substoichiometric spinels).

Spinels used in accordance with the invention are preferably stoichiometric or slightly non-stoichiometric spinels, usually with δ less than 0.1 and preferably less than 0.05 as an absolute value.

Mixed oxides with spinel structure used according to the invention have an electric conductivity like semiconductors, in other words their conductivity increases with temperature. Electronic conduction in these materials is made particularly by a hopping type mechanism. This is an electron exchange between cations of the same element (for example ion) occupying equivalent crystallographic sites (either tetrahedral or octahedral) and having ionisation states not equal to one.

As can be seen in the tests (see FIGS. 1 and 2), the process according to the invention is a means of obtaining cermets without an NiO phase which have considerable reversibility of their electrical resistivity with temperature.

The process according to the invention is applicable particularly to mixed oxides with spinel structure for which the chemical composition, apart from any doping agent(s) that may be present, satisfies the generic formula (I):

$$X_x R_y Z_z M_{3-x-y-z} O^{2-}_{4+\delta} \qquad (I)$$

in which:

R represents at least one metal chosen from among copper, nickel, iron and cobalt in the form of cations, X represents at least one metal chosen from among nickel, chromium, aluminium and tin, in the form of cations, Z represents a metal chosen from among titanium, zirconium, hafnium, vanadium, molybdenum and tungsten, in the form of cations, M represents at least one metal that may have two valence states, differing by one valence unit, chosen from among iron, molybdenum, manganese, vanadium, cobalt and copper, in the form of cations, x, y, z and (4+δ) are numbers representing quantities of X, R, Z and $O^{2-}$ ions respectively, x may vary from 0.1 to 2.0, y may vary from 0.05 to 1.0, z is less than 1, the sum (x+y+z) is less than 3, δ is a positive, negative or zero number, such that the spinel oxide with formula I is electrically neutral.

It can be seen that some metals such as molybdenum and vanadium may act equally well as M metals or Z metals.

In particular embodiments, products with formula I may have at least one of the following characteristics:

x is a number that can vary from 0.3 to 0.7, y is a number that can vary from 0.3 to 0.7, z is a number that can vary from 0.1 to 0.3.

During the reduction step that forms part of the process according to the invention, the oxides with formula I keep their spinel structure. If the starting point is an $AB_2O_4$ type of stoichiometric spinel satisfying formula I where δ=0, and R cations are totally reduced to R metallic atoms, the result is a type $AB_2O_4$ stoichiometric spinel. Since the reduction of a stoichiometric or substantially stoichiometric spinel results in a stoichiometric or substantially stoichiometric spinel, the reduction of R cations is accompanied by a reduction of some of $M^{n+}$ cations into $M^{(n-1)+}$ cations.

When the reduction is not carried very far, a product can be obtained in which some of the R cations are reduced to metallic form, while the remaining R cations remain in the spinel oxide. If the reduction reaction is continued further, after all R ions have been fully reduced (for example copper), it is also possible to reduce the X ions (for example nickel ions) and the result is then a metallic phase in the form of alloys (for example Cu—Ni). This is why nickel, for example, can act as R and as X in formula I at the same time. If the formula comprises two R type elements (for example Cu and Fe), it is also possible to obtain an R—R' metallic alloy (for example Cu—Fe).

In general, the composition of the mixed oxide may be modified by doping agents that are not represented by a general chemical formula such as formula I or II, and that do not necessarily form part of the crystalline lattice. For example, the presence of doping agents may facilitate regulation of crystallisation and sintering. Furthermore, doping agents may improve the conductivity of semiconducting spinel oxides with formula I or II. Thus, the initial mixture may possibly contain at least one doping agent. In general, the doping agents are present in the form of oxides, or possibly in the form of chemical or metal elements, in a proportion by weight that does not exceed 5% by weight, or preferably 2% by weight or more preferably 1% by weight, of the total weight of the mixed oxide. The doping agents may for example be silicon, phosphorus, boron, alkaline earth metals (particularly barium), alkaline metals, gallium, germanium, arsenic, indium, antimony, bismuth, scandium, yttrium, etc.

Another variant of the process according to the invention consists of adding another metallic oxide to the said mix, capable of forming a biphase oxides system with the said mixed oxide, and/or at least one metal that is difficult to oxidise at a temperature below 1000° C., such as Ag, Au, Pd, Pt or mixtures or alloys of them. The other oxide contains one or several cations that can be reduced to the metallic state less easily than the R ions contained in the initial mixed spinel. This other oxide can be used to modulate the electrical or thermomechanical properties or the resistance to electrochemical corrosion of the cermet in order to optimise properties of the anode for electrolysis of aluminium. The added metal(s) that may or may not alloy with the R metal obtained by reduction of the spinel is (are) also added in order to improve the previous properties. Another purpose of this addition is to make the metallic phase of the cermet "more noble", making it less soluble in the cryolithic medium used for electrolysis of aluminium.

Another object of the invention is the use of an anode comprising at least one part obtained, or that could be obtained, by the process described above, in an electrolytic aluminium production process, in other words for the production of aluminium by fused bath electrolysis. The temperature is of the order of 850 to 1075° C., typically between 875 and 975° C., and preferably between 900 and 960° C.

The invention also relates to a sintered cermet part with a determined shape enabling its use as an anode for manufacturing of aluminium, in which the chemical composition of the ceramic phase of the cermet, apart from the doping agents that may be present, satisfies formula II:

$$X_{x'} R_{y'} Z_z M'_{3-x'-y'-z} O^{2-}_{4+\delta} \qquad (I)$$

in which:

R represents at least one metal chosen from among copper, nickel, iron and cobalt, in the form of cations, X represents at least one metal chosen from among nickel, chromium, aluminium and tin, in the form of cations, Z represents at least one metal chosen from among titanium, zirconium, hafnium, vanadium, molybdenum and tungsten, in the form of cations, M' represents cations of the same metal that may have two different valence states, differing by one valence unit, n and n−1, the said cations being present in the product with formula II, partly in the form of $M'^{n+}$ cations and partly in the form of $M'^{(n-1)+}$ cations, the number of $M'^{n+}/M'^{(n-1)+}$ pairs being sufficient to assure that the cermet has an electrical conductivity at least equal to a predetermined value, where M' is at least one metal chosen particularly from among iron, molybdenum, manganese, vanadium, cobalt and copper, x', y', z and (4+δ) represent the quantities of X, R, Z, M' and $O^{2-}$ ions respectively, x' may vary from 0.1 to 2.0, y' is equal to zero or a number less than 0.05, z is less than 1.5, the sum $(x'+y'+z)$ is less than 3, δ is a positive, negative or zero number, such that the spinel oxide with formula II is electrically neutral, and in which the metallic phase is in the form of individual particles distributed in the spinel matrix.

The average size of metallic particles of the sintered part is typically between 1 and 10 micrometers.

Tests

The following tests illustrate the invention:

Test 1

A mixed dehydrated oxalate of iron, nickel and copper was prepared by adding a hydro-alcoholic solution (A) of metallic salts (300 ml of water+10 ml of hydrochloric acid at 37% by mass+200 ml of glycol ethylene+185.433 g of $FeSO_4$, $7H_2O$+ 44.214 g of $NiCl_2, 6H_2O$+22.674 g of $CuCl_2, 2H_2O$) to a solution (B) composed of 2 litres of 95% ethanol and 134.884 g of $H_2C_2O_4.2H_2O$.

After washing and drying, the oxalate precipitate thus prepared was treated in air at 700° C. so as to obtain a mixed spinel oxide with composition close to $Ni^{2+}_{0.6}Cu^{2+}_{0.4}Fe^{3+}_2O_4$. This oxide was mixed with the same mass of organic binder (12% by mass of DURAMAX B-1020 plus 82% by mass of water).

After oven drying at 80° C. for 1 hour, fractions of 1.5 g of a binder plus oxide mixture were placed in a cylindrical die and a uniaxial pressure of 200 MPa was then applied to them at ambient temperature.

The 20 mm diameter cylindrical parts with a thickness of about 2 mm derived from the previous operation were then debinded under air at 500° C. for 2 h, treated under a mixture of argon (96% by volume) and hydrogen (4% by volume) at 300° C. for 4 hours and were then placed under nitrogen at 980° C. for 0h30. The cermets obtained after these heat treatments are composed of a dispersion of copper particles in a semiconducting spinel ferrite matrix with a composition approximately equal to $Ni^{2+}_{0.7}Fe^{2+}_{0.3}Fe^{3+}_2O_4$, and for which the electrical conductivity is achieved by electron hopping between ferrous ions and ferric ions. X-ray diffraction also reveals the presence of very small quantity of cuprite $Cu_2O$ in cermets. The maximum diameter of the particles is closed to 2 μm. The average density of cermets is 5.26 g/cm³.

FIG. 1 shows a typical electrical conductivity curve for parts, obtained in this test. The conductivity was measured as a function of the temperature (a temperature increase followed by a temperature drop).

Test 2

A mixed oxalate was prepared using a protocol similar to that presented in test 1, but solution (A) was formed by 300 ml of water+10 ml of hydrochloric acid at 37% mass+200 ml of ethylene glycol+185.433 g of $FeSO_4, 7H_2O$+28.770 g of $NiCl_2, 6H_2O$+34.096 g of $CuCl_2, 2H_2O$. The solution (B) was identical to the above.

After washing and drying, the oxalate precipitate thus prepared was treated in air at 700° C. so as to obtain a mixed spinel oxide with composition close to $Ni^{2+}_{0.4}Cu^{2+}_{0.6}Fe^{3+}_2O^{2-}_4$. This oxide was mixed with the same mass of organic binder (12% by mass of DURAMAX B-1020 plus 82% by mass of water).

After oven drying at 80° C. for 1 hour, fractions of 1.5 g of a binder plus oxide mixture were placed in a cylindrical die and a uniaxial pressure of 200 MPa was then applied to them at ambient temperature.

The 20 mm diameter cylindrical parts with a thickness of about 2 mm derived from the previous operation were then debinded under air at 500° C. for 2 h, treated under a mixture of argon (96% by volume) and hydrogen (4% by volume) at 350° C. for 2 hours and were then placed under nitrogen at 980° C. for 0h30. The cermets obtained after these heat treatments are composed of a dispersion of Cu—Ni alloy particles in a semiconducting spinel ferrite matrix with a composition approximately equal to $Ni^{2+}_{0.5}Fe^{2+}_{0.5}Fe^{3+}_2O_4$, and for which the electrical conductivity is achieved by electron hopping between ferrous ions and ferric ions. The maximum diameter of the particles is closed to 2 μm. The average density of cermets is equal to 5.4 g/cm³, which is a density equal to 98% compared with the theoretical density of a $Ni^{2+}_{0.5}Fe^{2+}_{0.5}Fe^{3+}_2 O_4/0.75$ Cu cermet. The electrical conductivity is approximately 31 S/cm, at a temperature of 20° C.

Figure 2:
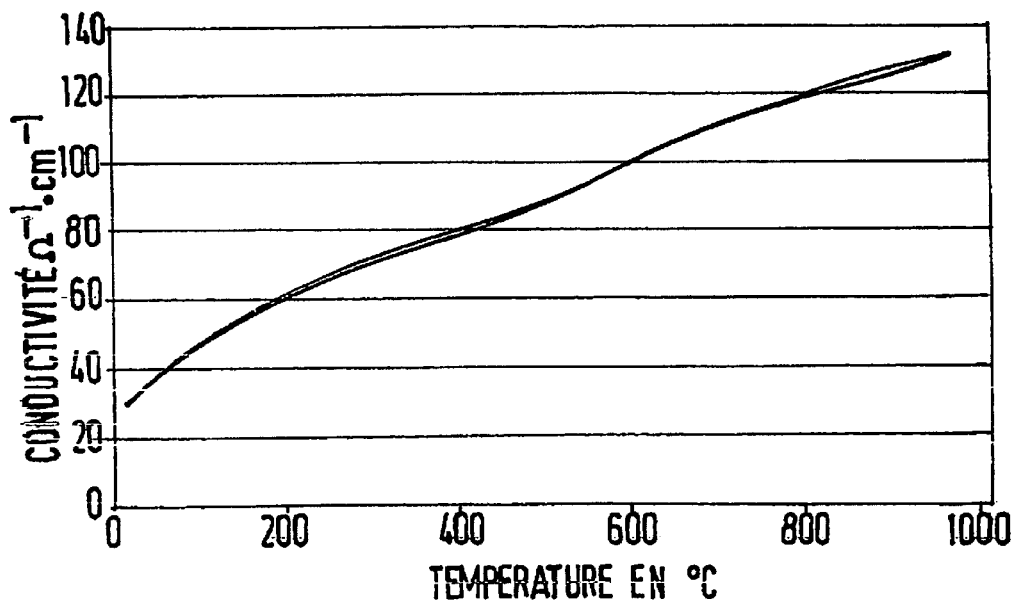

FIG. 2 shows a typical electrical conductivity curve for parts, obtained in this test. The conductivity was measured as a function of the temperature (a temperature increase followed by a temperature drop).

Test 3

A mixed oxalate was prepared using exactly the same protocol as that described in test 1.

After washing and drying, the oxalate precipitate thus prepared was treated in air at 700° C. so as to obtain a mixed spinel oxide with a composition close to $Ni^{2+}_{0.6}Cu^{2+}_{0.4}Fe^{3+}_2O_4$. This oxide was mixed with the same mass of organic binder (12% by mass of DURAMAX B-1020 plus 82% by mass of water).

After oven drying at 80° C. for 1 hour, fractions of 1.5 g of the binder plus oxide mixture were placed in a cylindrical die and a uniaxial pressure of 200 MPa was then applied to them at ambient temperature.

The 20 mm diameter cylindrical parts with a thickness of about 2 mm derived from the previous operation were then debinded under air at 500° C. for 2 h, treated under a mixture of argon (96% by volume) and hydrogen (4% by volume) at 500° C. for 0h30 and were then placed under nitrogen at 980° C. for 0h30. The cermets obtained after these heat treatments are composed of a dispersion of metallic alloy particles with a composition approximately equal to $\gamma\text{-}CU_{0.4}\text{—}Ni_{0.6}$, in a semiconducting spinel ferrite matrix with a composition close to $Ni^{2+}_xCu^{2+}_yFe^{2+}_xFe^{3+}_2O_4$ (x<0.6, y<0, 4, x+y+z=1) and for which the electrical conductivity is achieved by electron hopping between ferrous ions and ferric ions. The maximum diameter of the particles is closed to 5 μm.

Test 4

The production protocol used was the same as that used for test 3. However, the cylindrical parts were treated at 600° C. for 0h30 under a mixture of argon (96% by volume) and hydrogen (4% by volume) and then sintered at 980° C. for 0h30 under nitrogen.

The cermets obtained after these heat treatments are composed of a dispersion of metallic alloy particles with a composition approximately equal to $\gamma\text{-}Cu_{0.6}\text{—}Ni_{0.4}$ and body-centred cubic iron α-Fe in a semiconducting spinel ferrite matrix, with a composition close to $Ni^{2+}_xCu^{2+}_yFe^{2+}_zFe^{3+}_2O_4$ (x<0.6, y<0,4, x+y+z=1) and for which the electrical conductivity is achieved by electron hopping between ferrous ions and ferric ions.

Test 5

An initial mixture was obtained by a powder mixture comprising 95.2% by weight of a mixed spinel oxide with composition equal to approximately $Ni_{0.4}^{2+}Cu_{0.6}^{2+}Fe_2^{3+}O_4$ (obtained by spray-pyrolysis), 3.8% by weight of polyvinyl alcohol (PVA) and 1% by weight of carbon black (with a specific surface area equal to 240 m²/g).

10 mm diameter and 6 mm long cylindrical parts were obtained by uniaxial pressing of this initial mixture and baking at 1200° C. under argon.

The densification ratio of the baked parts was 93% and they contained a dispersion of metallic particles (Cu—Ni alloy with about 12% by weight of Ni), with a size of between about 2 and 5 µm.

The invention claimed is:

1. Process for manufacturing a part with a determined shape designed to form all or part of an anode for the production of aluminium by fused bath electrolysis and containing a cermet comprising at least one metallic oxide with spinel structure and at least one metallic phase, comprising:
   preparation of a prepared powder containing at least one mixed oxide with spinel structure in which one of the constituents is a metal R present in the form of cations, said metal R being wholly or partly reducible by a reduction operation, so as to form all or part of said metallic phase, said reduction operation being carried out at least partly using a powder of a carbonaceous material and during the manufacturing process of said part,
   preparation of a mixture containing said prepared powder and a binder,
   shaping of said part by compaction of the mixture,
   a debinding operation of said part,
   a sintering operation of said part.

2. Manufacturing process according to claim 1, in which the metal R is at least one metal chosen from among copper, nickel, iron and cobalt.

3. Manufacturing process according to claim 1, in which said mixed oxide contains at least one metal M, that can exist in at least two valence states $M^{n+}$ and $M^{(n-1)+}$, as a constituent in the form of cations.

4. Manufacturing process according to claim 3, in which said metal M is chosen from among iron, molybdenum, manganese, vanadium, cobalt and chromium.

5. Manufacturing process according to claim 1, in which said mixed oxide also contains as a constituent at least one metal in which the cation reduces the solubility of the mixed oxide with spinel structure in molten cryolite.

6. Manufacturing process according to claim 5, in which said metal is chosen from among nickel, chromium and tin.

7. Manufacturing process according to claim 1, in which said mixed oxide contains at least one metal with a valence state of more than 3.

8. Manufacturing process according to claim 7, in which said metal is chosen particularly from among titanium, zirconium, hafnium, vanadium, molybdenum and tungsten.

9. Manufacturing process according to claim 1, in which said mixed oxide is obtained by a spray—pyrolysis process comprising:
   preparation of at least one salt of metallic elements that will form the mixed oxide;
   dissolution of said salt, or putting them into suspension, in a carrier fluid;
   spraying of said solution and/or said suspension at a sufficiently high temperature to cause evaporation of the carrier fluid and thermal decomposition of said salt, so as to obtain said mixed oxide.

10. Manufacturing process according to claim 9, in which said salt is prepared by a mineral acid attack on pure metals.

11. Manufacturing process according to claim 1, also comprising an atomisation operation on the mixture before the shaping step comprising:
   putting the mixture into suspension in a carrier fluid,
   spraying of the suspension so as to completely dry the suspension before its collection and handling.

12. Manufacturing process according to claim 1, in which said reduction is controlled.

13. Manufacturing process according to claim 1, in which said reduction operation is wholly or partly done on the part after the debinding operation.

14. Manufacturing process according to claim 13, in which the debinding operation of the part includes a heat treatment under an oxidising atmosphere that can decompose the binder in the form of $CO_2$ and water vapour, and the reduction operation is carried out under a reducing atmosphere that subjects the debinded part to the action of a reducing agent that reduces all or some of the cations of the metal R present in said mixed oxide, to the metallic state.

15. Manufacturing process according to claim 14, in which the reducing agent is chosen from among hydrogen, carbon monoxide, ammonia and mixtures of them.

16. Manufacturing process according to claim 14, in which said reducing atmosphere is a mixture of inert gas and said reducing agent.

17. Manufacturing process according to claim 14, in which said reducing atmosphere is a mixture of inert gas and hydrogen containing 0.5 to 10% of hydrogen by volume.

18. Manufacturing process according to claim 1, in which said reduction operation is done wholly or partly on the part during the debinding operation.

19. Manufacturing process according to claim 18, in which the debinding operation of the part includes a debinding and reduction heat treatment under a controlled atmosphere in which the reducing agent is the binder or decomposition products of the binder.

20. Manufacturing process according to claim 1, in which said reduction operation is carried out wholly or partly on the powder containing the mixed oxide, before the binder is introduced.

21. Manufacturing process according to claim 20, in which the debinding operation is done under a controlled atmosphere, so as to avoid reoxidation of the metal.

22. Manufacturing process according to claim 20, in which the prepared powder containing the mixed oxide also contains a determined proportion of said powder of a carbonaceous material intended to reduce wholly or partly said metal R during the reduction operation.

23. Manufacturing process according to claim 22, in which the carbonaceous material is chosen from among carbon black and graphite.

24. Manufacturing process according to claim 20, in which the prepared powder containing the mixed oxide also contains a determined proportion of a powder of an organometallic compound containing at least said metal R in the form of a cation, intended to wholly or partly reduce said metal R during the reduction operation.

25. Manufacturing process according to claim 24, in which the organometallic compound is chosen from among oxalates.

26. Manufacturing process according to claim 1, in which said mixture also contains a determined proportion of said powder of a carbonaceous material intended to wholly or partly reduce the said metal R during reduction operation.

27. Manufacturing process according to claim 26, in which the carbonaceous material is chosen from among carbon black and graphite.

28. Manufacturing process according to claim 1, in which said mixture also contains a determined proportion of a powder of an organometallic compound containing at least said metal R in the form of a cation, intended to wholly or partly reduce said metal R during the reduction operation.

29. Manufacturing process according to claim 28, in which the organometallic compound is chosen from among oxalates.

30. Manufacturing process according to claim 1, in which said reduction operation is carried out so as to enable reduction of a predetermined proportion of cations of the metal R, to the metallic state.

31. Manufacturing process according to claim 30, in which the reduction operation is done at a temperature between 200 and 750° C.

32. Manufacturing process according to claim 30, in which the reduction operation is done at a temperature between 250 and 550° C.

33. Manufacturing process according to claim 30, in which the reduction operation is done at a temperature between 300 and 450° C.

34. Manufacturing process according to claim 30, in which the reduction operation is done for a time that can vary from 0.5 to 10 h.

35. Manufacturing process according to claim 1, in which said reduction operation is done so as to obtain a proportion of metallic phase in a cermet equal to between 10 and 30% by weight.

36. Manufacturing process according to claim 1, in which said mixed oxide with spinel structure has a chemical composition which, apart from any doping agent(s) that may be present, satisfies the generic formula (I):

$$X_x R_y Z_z M_{3-x-y-z} O^{2-}{}_{4+\delta} \tag{I}$$

in which:
R represents at least one metal chosen from among copper, nickel, iron and cobalt in the form of cations,
X represents at least one metal chosen from among nickel, chromium, aluminium and tin, in the form of cations,
Z represents a metal chosen from among titanium, zirconium, hafnium, vanadium, molybdenum and tungsten, in the form of cations,
M represents at least one metal that may have two valence states, differing by one valence unit, chosen from among iron, molybdenum, manganese, vanadium, cobalt and copper, in the form of cations,
x, y, z and (4+δ) are numbers representing quantities of X, R, Z and $O^{2-}$ ions respectively,
x may vary from 0.1 to 2.0,
y may vary from 0.05 to 1.0,
z is less than 1,
the sum (x+y+z) is less than 3,
δ is a positive, negative or zero number, such that the spinel oxide with formula I is electrically neutral.

37. Manufacturing process according to claim 36, in which the chemical composition according to formula I has at least one of the following characteristics:
x is a number that can vary from 0.3 to 0.7,
y is a number that can vary from 0.3 to 0.7,
z is a number that can vary from 0.1 to 0.3.

38. Manufacturing process according to claim 1, in which said mixture also contains at least one doping agent.

39. Manufacturing process according to claim 38, in which the doping agent is present in the form of oxides, chemical elements or metals.

40. Manufacturing process according to claim 38, in which the doping agent is present in a proportion by weight that does not exceed 5% by weight.

41. Manufacturing process according to claim 1, in which said mixture also contains another metallic oxide capable of forming a biphase oxides system with said mixed oxide.

42. Manufacturing process according to claim 1, in which said mixture also contains at least one metal that is difficult to oxidise at a temperature below 1000° C.

43. Manufacturing process according to claim 42, in which said metal that is difficult to oxidise is chosen from among Ag, Au, Pd, Pt or mixtures or alloys of them.

44. An anode comprising at least one part obtained using the process according to claim 1 for the production of aluminium by fused bath electrolysis.

45. An electrolytic cell comprising at least an anode comprising at least one part obtained using the process according to claim 1.

46. Sintered cermet part with a determined shape enabling its use as an anode for the production of aluminium, in which the chemical composition of the ceramic phase of the cermet, apart from the doping agents that may be present, satisfies formula II:

$$X_{x'} R_{y'} Z_z M'_{3-x'-y'-z} O^{2-}{}_{4+\delta} \tag{I}$$

in which:
R represents at least one metal chosen from among copper, nickel, iron and cobalt, in the form of cations,
X represents at least one metal chosen from among nickel, chromium, aluminium and tin, in the form of cations,
Z represents at least one metal chosen from among titanium, zirconium, hafnium, vanadium, molybdenum and tungsten, in the form of cations,
M' represents cations of the same metal that may have two different valence states, differing by one valence unit, n and n-1, said cations being present in the product with formula II, partly in the form of $M'^{n+}$ cations and partly in the form of $M'^{(n-1)+}$ cations, the number of $M'^{n+}/M'^{(n-1)+}$ pairs being sufficient to assure that the cermet has an electrical conductivity at least equal to a predetermined value, where M' is at least one metal chosen particularly from among iron, molybdenum, manganese, vanadium, cobalt and copper,
x', y', z and (4+δ) represent the quantities of X, R, Z, M' and $O^{2-}$ ions respectively,
x' may vary from 0.1 to 2.0,
y' is equal to zero or a number less than 0.05,
z is less than 1.5,
the sum (x'+y'+z) is less than 3,
δ is a positive, negative or zero number, such that the spinel oxide with formula II is electrically neutral,
and in which the metallic phase is in the form of individual particles with an average size between 1 and 10 micrometers distributed in the spinel matrix.

* * * * *